(12) United States Patent
Nakajima

(10) Patent No.: US 8,724,126 B2
(45) Date of Patent: May 13, 2014

(54) PRINTING APPARATUS, PROGRAM, AND PRINTER DRIVER

(75) Inventor: Norihiko Nakajima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 741 days.

(21) Appl. No.: 12/562,856

(22) Filed: Sep. 18, 2009

(65) Prior Publication Data

US 2010/0079776 A1 Apr. 1, 2010

(30) Foreign Application Priority Data

Sep. 29, 2008 (JP) ................................ 2008-249804

(51) Int. Cl.
*G06F 3/12* (2006.01)
*H04N 1/46* (2006.01)
*B41J 2/165* (2006.01)

(52) U.S. Cl.
USPC ............ 358/1.13; 358/1.15; 358/502; 347/24

(58) Field of Classification Search
USPC ........ 358/1.15, 1.13, 1.1, 501, 502, 503, 434, 358/442, 444; 399/1, 2, 6; 355/32, 88, 112
See application file for complete search history.

(56) References Cited

U.S. PATENT DOCUMENTS

| | | | | | |
|---|---|---|---|---|---|
| 4,638,372 | A | * | 1/1987 | Leng et al. | 358/296 |
| 5,963,758 | A | * | 10/1999 | Corn et al. | 399/57 |
| 6,234,606 | B1 | * | 5/2001 | Suzuki | 347/43 |
| 6,267,519 | B1 | * | 7/2001 | Otsuki et al. | 400/283 |
| 6,334,717 | B1 | * | 1/2002 | Uchida et al. | 358/1.13 |
| 6,937,360 | B1 | * | 8/2005 | Ikeda et al. | 358/1.4 |
| 6,968,076 | B1 | * | 11/2005 | OuYang et al. | 382/112 |
| 7,175,250 | B2 | * | 2/2007 | Nimura | 347/19 |
| 7,411,697 | B2 | * | 8/2008 | Kuno | 358/1.9 |
| 7,548,333 | B2 | * | 6/2009 | Tokura et al. | 358/1.15 |
| 7,724,386 | B2 | * | 5/2010 | Takahashi | 358/1.15 |
| 7,862,149 | B2 | * | 1/2011 | Yasutani et al. | 347/43 |
| 7,903,284 | B2 | * | 3/2011 | Kadota | 358/1.9 |
| 8,169,629 | B2 | * | 5/2012 | Kuroda et al. | 358/1.13 |
| 8,179,537 | B2 | * | 5/2012 | Kumagai | 358/1.13 |
| 8,289,555 | B2 | * | 10/2012 | Kawai | 358/1.15 |
| 8,305,595 | B2 | * | 11/2012 | Kuroda et al. | 358/1.13 |
| 8,325,370 | B2 | * | 12/2012 | Hashimoto | 358/1.15 |
| 8,422,063 | B2 | * | 4/2013 | Nishida | 358/1.15 |
| 8,437,021 | B2 | * | 5/2013 | Yokoyama | 358/1.15 |
| 8,488,139 | B2 | * | 7/2013 | Utsubo et al. | 358/1.14 |
| 2003/0164971 | A1 | * | 9/2003 | Kidani et al. | 358/1.13 |
| 2003/0210414 | A1 | * | 11/2003 | Kuno | 358/1.9 |
| 2004/0008360 | A1 | * | 1/2004 | Ankrum et al. | 358/1.13 |
| 2004/0012816 | A1 | * | 1/2004 | Minowa | 358/2.1 |

(Continued)

FOREIGN PATENT DOCUMENTS

| | | |
|---|---|---|
| JP | 06-183032 A | 7/1994 |
| JP | 2008-134464 A | 6/2008 |
| JP | 2008-134560 A | 6/2008 |

*Primary Examiner* — Madelein A Nguyen

(74) *Attorney, Agent, or Firm* — Global IP Counselors, LLP

(57) ABSTRACT

A printing apparatus capable of executing color printing and monochrome printing includes: a mode controller which controls a monochrome printing mode where the monochrome printing is executed, a first mode where reception of a printing job stops when a color image forming medium has run out, and a second mode where procession to the monochrome printing mode is possible; an exclusive controller which receives only one printing job in a first time period; and a print executing unit which execute printing on the basis of the printing job received by the exclusive controller.

6 Claims, 3 Drawing Sheets

(56) References Cited

U.S. PATENT DOCUMENTS

| | | | |
|---|---|---|---|
| 2004/0125389 A1* | 7/2004 | Tokura et al. | 358/1.9 |
| 2004/0125395 A1* | 7/2004 | Onishi | 358/1.13 |
| 2004/0145771 A1* | 7/2004 | Stringham | 358/1.15 |
| 2005/0007621 A1* | 1/2005 | Barry et al. | 358/1.14 |
| 2005/0057592 A1* | 3/2005 | Nimura | 347/14 |
| 2005/0078130 A1* | 4/2005 | Fernandez | 347/7 |
| 2005/0078332 A1* | 4/2005 | Brown | 358/1.14 |
| 2005/0168505 A1* | 8/2005 | Ide et al. | 347/8 |
| 2005/0207789 A1* | 9/2005 | Inukai et al. | 399/223 |
| 2005/0219618 A1* | 10/2005 | Shimada | 358/2.1 |
| 2006/0028669 A1* | 2/2006 | Kumagai | 358/1.13 |
| 2006/0082825 A1* | 4/2006 | Lee | 358/1.15 |
| 2006/0203269 A1* | 9/2006 | Murayama | 358/1.9 |
| 2006/0203280 A1* | 9/2006 | Kobayashi et al. | 358/1.14 |
| 2006/0228122 A1* | 10/2006 | Kamei et al. | 399/23 |
| 2006/0232799 A1* | 10/2006 | Nakatani et al. | 358/1.9 |
| 2006/0238781 A1* | 10/2006 | Fukao | 358/1.9 |
| 2006/0251296 A1* | 11/2006 | Nishida et al. | 382/112 |
| 2007/0071486 A1* | 3/2007 | Chiba et al. | 399/101 |
| 2007/0177185 A1* | 8/2007 | Ogura et al. | 358/1.14 |
| 2007/0212127 A1* | 9/2007 | Yoshiyama et al. | 399/302 |
| 2007/0273914 A1* | 11/2007 | Hosoda | 358/1.14 |
| 2007/0283155 A1* | 12/2007 | Kato | 713/171 |
| 2008/0068650 A1* | 3/2008 | Negoro | 358/1.15 |
| 2008/0080000 A1* | 4/2008 | Kadota | 358/1.15 |
| 2008/0130030 A1* | 6/2008 | Okunishi et al. | 358/1.9 |
| 2008/0151294 A1* | 6/2008 | Natori et al. | 358/1.15 |
| 2008/0231887 A1* | 9/2008 | Sakagami et al. | 358/1.15 |
| 2008/0240826 A1* | 10/2008 | Shen | 400/62 |
| 2008/0247792 A1* | 10/2008 | Kubo | 399/377 |
| 2008/0316511 A1* | 12/2008 | Sakamoto | 358/1.9 |
| 2008/0317506 A1* | 12/2008 | Furukawa | 399/223 |
| 2009/0148202 A1* | 6/2009 | Aiba | 399/303 |
| 2009/0279130 A1* | 11/2009 | Horiyama | 358/1.15 |
| 2010/0079776 A1* | 4/2010 | Nakajima | 358/1.9 |
| 2010/0079805 A1* | 4/2010 | Hashimoto | 358/1.15 |
| 2010/0199883 A1* | 8/2010 | Shimada | 106/31.13 |
| 2011/0069100 A1* | 3/2011 | Yasutani et al. | 347/9 |
| 2011/0164262 A1* | 7/2011 | Nakatani et al. | 358/1.9 |
| 2011/0191131 A1* | 8/2011 | Katoh et al. | 705/7.11 |
| 2012/0148267 A1* | 6/2012 | Kawai | 399/8 |
| 2012/0177392 A1* | 7/2012 | Murayama | 399/66 |

* cited by examiner

PRINTING APPARATUS, PROGRAM, AND PRINTER DRIVER

CROSS-REFERENCE TO RELATED APPLICATIONS

This application claims priority to Japanese Application No. 2008-249804 filed on Sep. 29, 2008. The entire disclosure of Japanese Application No. 2008-249804 is incorporated herein by reference.

BACKGROUND

1. Technical Field

The present invention relates to a printing technique when color ink has run out.

2. Related Art

In recent ink jet printers, all types of printing cannot be executed even when just one of ink colors has run out.

Among the ink jet printers, there is an ink jet printer which has a function of converting color data into monochrome data, when color ink has run out (for example, an ink jet printer disclosed in JP-A-6-183032).

However, recent ink jet printers are mainly used as a part of a multi-function apparatus. Therefore, when the color data are converted into the monochrome data to execute printing, the following problems arise.

(1) In a case of direct printing from a memory card or a digital camera, a print result may be useless for a user, when the color data are converted into the monochrome data in a printer. Moreover, a message indicating the conversion to the color data or selection of a user executed whether to convert the monochrome data into the color data is not possible in the present communication protocols (communication with a digital camera or the like).

(2) In a case of FAX printing, it is not preferable that a transmission result is changed due to the requirements of the printer since important information is exchanged.

SUMMARY

An advantage of some aspects of the invention is that it provides a technique for enabling monochrome printing without the above-mentioned problems even when color ink has run out.

According to an aspect of the invention, there is provided a printing apparatus capable of executing color printing and monochrome printing. The printing apparatus includes: a mode controller which controls a monochrome printing mode where the monochrome printing is executed, a first mode where reception of a printing job stops when color ink has run out, and a second mode where procession to the monochrome printing mode is possible; an exclusive controller which receives only one printing job in a first time period; and a print executing unit which execute printing on the basis of the printing job received by the exclusive controller. In the first mode, the mode controller receives a request for proceeding to the second mode and permits a mode to proceed from the first mode to the second mode by notifying a driver of a host computer that only the monochrome printing is possible, when receiving the request. When the exclusive controller receives a monochrome printing command from the driver in the second mode, the mode controller permits the mode to proceed to the monochrome printing mode, the exclusive controller executes the printing on the basis of the printing job from the exclusive controller, and then the mode controller permits the mode to return to the second mode.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

Figure 1:
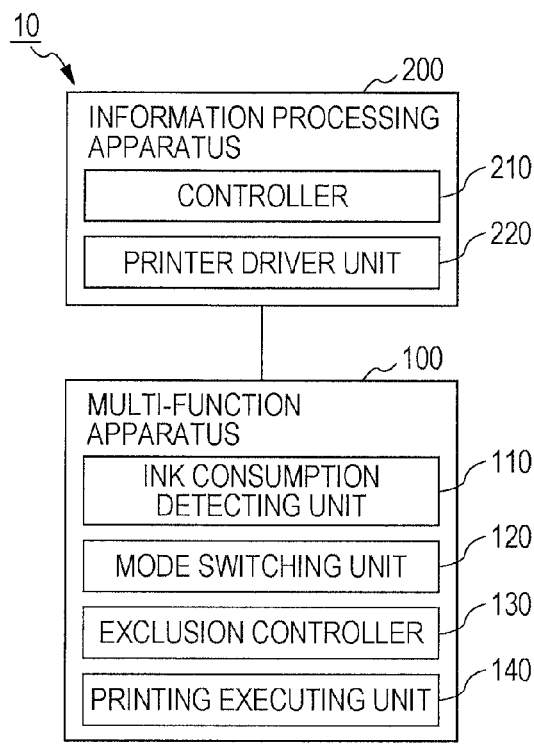
FIG. 1 is a block diagram illustrating an example of the functional configuration of a printing system according to an embodiment of the invention.

FIG. 1 is a block diagram illustrating an example of the functional configuration of a printing system 10 according to an embodiment of the invention. As illustrated, the printing system 10 includes a multi-function apparatus 100 and an information processing apparatus 200.

The information processing apparatus 200 is realized by a general computer including a CPU (Central Processing Unit), a RAM (Random Access Memory), a ROM (Read-Only Memory), a hard disk, a display device such as a display, input devices such as a keyboard or a mouse, and a communication interface transmitting or receiving data to and from the multi-function apparatus 100, none of which are shown.

As illustrated, the information processing apparatus 200 include a controller 210 and a printer driver unit 220. The units (210 and 220) are realized by allowing the CPU to execute computer programs loaded from the ROM to the RAM included in the information processing apparatus 200.

The controller 210 controls the information processing apparatus 200 as a whole so as to cause the information processing apparatus 200 to function as a host computer of the multi-function apparatus 100. For example, the controller 210 supplies an application for generating image the data of a print target.

The printer driver unit 220 executes a process of controlling the multi-function apparatus 100 so as to execute printing. For example, the printer driver unit 220 converts the image data of the print target into print data which can be analyzed in the multi-function apparatus 100 and outputs the converted image data to the multi-function apparatus 100. In addition, the printer driver unit 220 outputs print data corresponding to one page or a plurality of pages as one printing job to the multi-function apparatus 100, when receiving a print request from a user.

The printer driver unit 220 outputs a command group to the multi-function apparatus 100 for controlling the printing in the multi-function apparatus 100. The command group includes a releasing command for releasing the multi-function apparatus 100, where color ink (a color image forming medium) has run out (cannot be used), from an ink depleted state. The releasing command is output to the multi-function apparatus 100 before the print data are output for every printing job. Only the printer driver unit 220 of the information processing apparatus 200 is capable of outputting the releasing command to the multi-function apparatus 100.

The printer driver unit 220 allows the display device (not shown) such as a display to display a message for notifying the user or various configuration pictures for the printing in the multi-function apparatus 100. The printer driver unit 220 receives various instructions made by the user from the input devices (not shown) constituted by a touch panel, buttons, or the like.

The multi-function apparatus 100 includes a CPU, a RAM, a ROM, a communication interface for transmitting or receiving data to and from the information processing apparatus 200, an external interface for receiving data from an external apparatus (for example, a digital camera or a memory card), a facsimile interface for transmitting and receiving FAX data through a telephone line, a printing engine including a printing mechanism, feeding and discharging mechanism, and the like, none of which are shown. With such a configuration, the multi-function apparatus 100 realizes a printing function (including a direct printing function, etc.), a copy function, a scanning function, a FAX communication function, and the like. However, the multi-function apparatus 100 may have at least the printing function and may be a general ink jet printer, a color laser printer, or a sublimation type printer.

As illustrated, the multi-function apparatus 100 includes an ink depletion detecting unit 110, a mode switching unit 120, an exclusive controller 130, and a print executing unit 140. The units (110 to 140) are realized by allowing the CPU to execute computer programs load from the ROM to the Ram included in the multi-function apparatus 100 and by allowing the printing engine to operate. Alternatively, exclusive-use ASICs (Application Specific Integrated Circuit) for realizing the functions may be included.

The ink depletion detecting unit 110 determines whether an amount of each color ink consumed exceeds a predetermined threshold (ink depletion). Specifically, the ink depletion detecting unit 110 detects an amount of remaining ink from the amount of ink consumed in respective ink cartridges for colors such as cyan, yellow, magenta, and black. The ink depletion detecting unit 110 determines the ink depletion, when the detected amount of remaining ink is smaller than the predetermined threshold.

The mode switching unit 120 switches between various modes in the multi-function apparatus 100. Here, the various modes include a normal mode, a first ink depletion mode, a second ink depletion mode, a monochrome printing mode, and a third ink depletion mode, which are described below.

Figure 2:
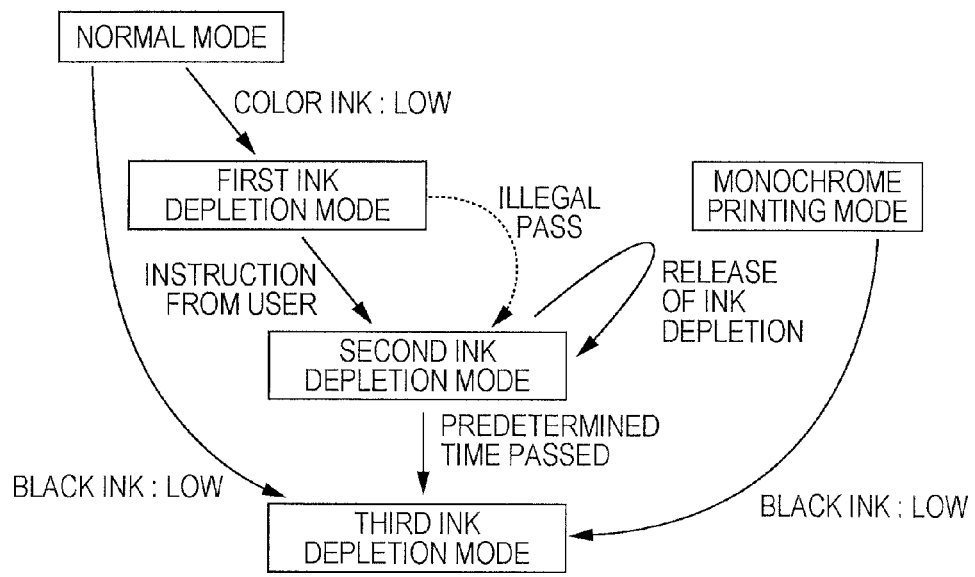
FIG. 2 is a diagram illustrating a relation between modes set in a multi-function apparatus.

FIG. 2 is a diagram illustrating a relation between the modes.

The normal mode refers to a mode where either the color printing or the monochrome printing can be executed.

The first ink depletion mode refers to a mode where procession to the second ink mode is possible by an instruction of the user when one of the various kinds of color ink (other than black ink) has run out. However, as an exception, even when there is no instruction of the user but a printing job is received together with the releasing command in the first ink depletion mode, the monochrome printing mode proceeds (illegal pass).

The second ink depletion mode refers to a mode where the ink depleted state has been released and the mode proceeds to the monochrome printing mode when the releasing command is received. When a monochrome printing instruction is initially received in the second ink depletion mode (the mode proceeds to the monochrome printing mode to execute the monochrome printing) and then a predetermined period of time (for example, five days) without receiving the releasing command after a second time period, the mode proceeds to the third ink depletion mode.

The monochrome printing mode refers to a mode where the monochrome print data received from the information processing apparatus 200 is printed even when the color ink has run out. In the monochrome printing mode, the mode returns to the second ink depletion mode after the monochrome print data for one printing job is printed.

The third ink depletion mode refers to a mode where the printing is not possible in the multi-function apparatus 100. Once the mode proceeds to the third ink depletion mode, the mode cannot proceed to any mode such as the monochrome printing mode. However, when the ink cartridge is exchanged, the mode proceeds to the normal mode.

The exclusive controller 130 controls reception of a print job (print data) in accordance with the status (mode) of the multi-function apparatus 100. For example, the exclusive controller 130 stops receiving all of the print jobs, when the multi-function apparatus 100 is in the ink depleted state (the first ink depletion mode, the second ink depletion mode, and the third ink depletion mode). When the multi-function apparatus 100 is in the monochrome printing mode, only one printing job is received. Here, in the monochrome printing mode, when the printing for one printing job is executed, as described above, the mode immediately returns to the second ink depletion mode. Therefore, only one printing job is received in a first time period (which is a period in which the mode proceeds to the second ink depletion mode after the monochrome printing mode).

The print executing unit 140 prints the print data for the printing job received by the exclusive controller 130. In the monochrome printing mode, the print executing unit 140 executes setting on the printing engine to execute the printing only using black ink.

Figure 3:
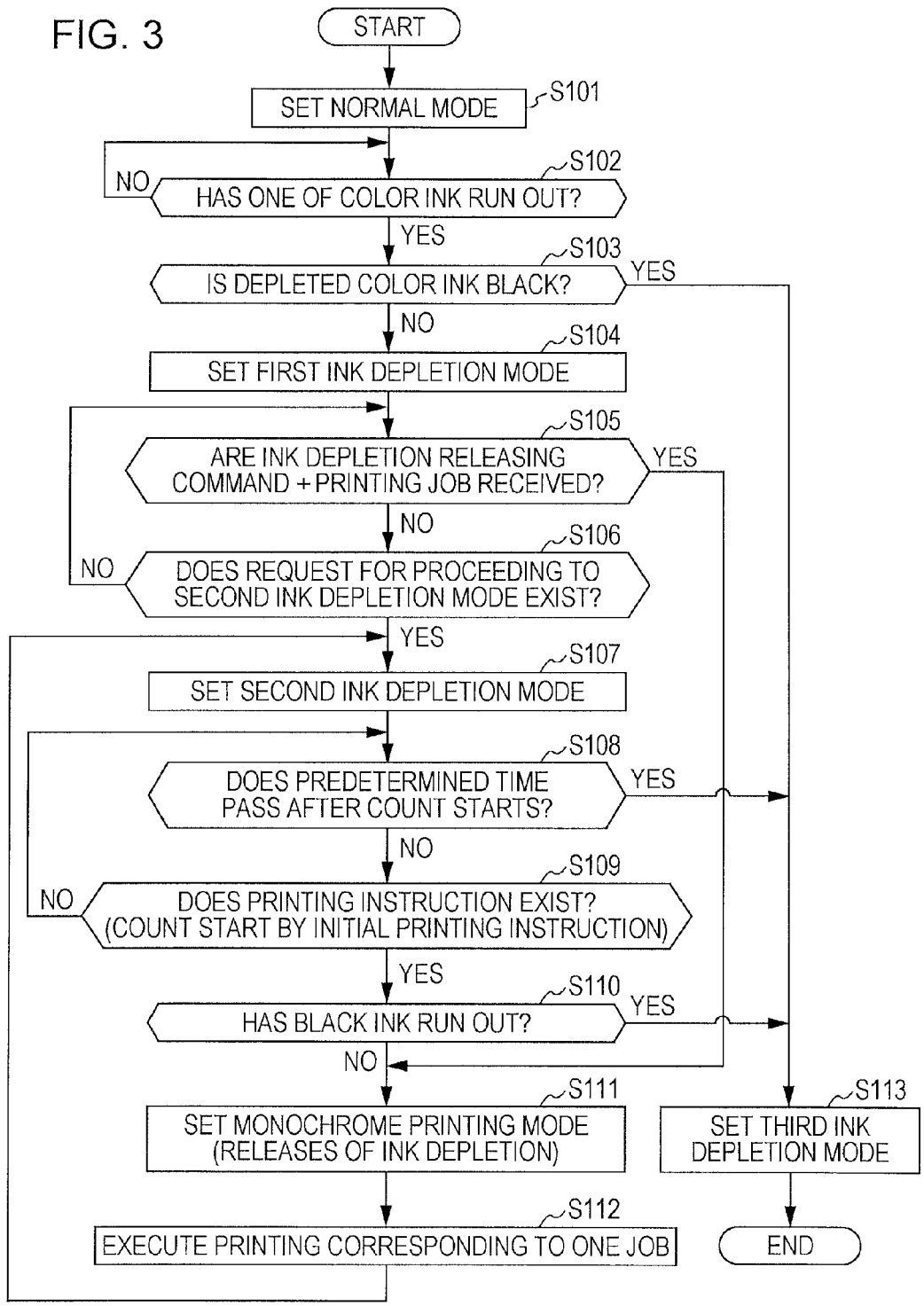
FIG. 3 is a flowchart illustrating a mode switching process executed by the multi-function apparatus.

Next, noticeable operations of the multi-function apparatus 100 in the printing system 10 having the above-described configuration will be described. FIG. 3 is a flowchart illustrating the mode switching process executed by the multi-function apparatus 100.

When the multi-function apparatus 100 is turned on, the mode switching unit 120 starts the mode switching process. First, the mode switching unit 120 sets the multi-function apparatus 100 to the normal mode where normal printing is possible (step S101).

In the normal mode, the mode switching unit 120 stands by until one of the color ink has run out (No in step S102). Specifically, the mode switching unit 120 stands by until the ink depletion detecting unit 110 determines that one of the color ink has run out.

When one of the color ink has run out (Yes in step S102), the mode switching unit 120 displays a message for notifying the user that the color ink has run out in the panel included in the multi-function apparatus 100. Then, the process proceeds to step S103.

Subsequently, the mode switching unit 120 determines whether the color of the ink determined to have run out in step S102 is a black color (step S103). Specifically, the mode switching unit 120 specifies the color determined to run out by the ink depletion detecting unit 110 and determines whether the specified color is the black color.

When it is determined that the deleted ink is the black color (Yes in step S103), the mode switching unit 120 permits proceeding to step S113 to switch the mode of the multi-function apparatus 100 to a print disapproval state (the third ink depletion mode).

Alternatively, when it is determined that the deleted ink is not the black ink (No in step S103), the mode switching unit 120 permits proceeding to step S104 to set the multi-function apparatus 100 to the first ink depletion mode (step S104).

Specifically, the exclusive controller 130 stops receiving all of the printing jobs (the print data). The mode switching unit 120 deletes all of the printing jobs (including the monochrome print data) accumulated in the multi-function apparatus 100. The mode switching unit 120 notifies the printer driver unit 220 of the information processing apparatus 200 that the first ink depletion mode has been set.

When the first ink depletion mode is set, the exclusive controller 130 determines whether the printing job including the monochrome print data is received together with the releasing command for releasing the ink depleted state (step S105).

Here, when the exclusive controller 130 receives the printing job and the releasing command (Yes in step S105), the mode switching unit 120 permits proceeding to step S111 (illegal pass) to set the multi-function apparatus 100 to the monochrome printing mode (step S111).

Alternatively, when the exclusive controller 130 does not receive the printing job and the releasing command (No in step S105), the mode switching unit 120 permits proceeding to step S106 to determine whether a request for proceeding to the second ink depletion mode has been issued from the printer driver unit 220.

When the request for processing to the second ink depletion mode has not been issued from the printer driver unit 220 (No in step S106), the mode switching unit 120 returns the process to step S105. Then, the exclusive controller 130 receives the printing job and the releasing command or the mode switching unit 120 maintains the first ink depletion mode until the request for proceeding to the second ink depletion mode is received.

Alternatively, when the request for proceeding to the second ink depletion mode (Yes in step S106), the mode switching unit 120 sets the multi-function apparatus 100 to the second ink depletion mode (step S107). Here, the print executing unit 140 sets the printing engine so that the monochrome printing is possible. The exclusive controller 130 stops receiving all of the printing jobs.

When it is determined that a period elapsed after the initial reception of the releasing command (the instruction of the monochrome printing) (Yes in S109 described below) does not exceed the predetermined period (for example, five days) (No in step S108), the mode switching unit 120 determines whether the releasing command is received from the printer driver unit 220 (step S109).

When the releasing command has not been received from the printer driver unit 220 (No in step S109), the mode switching unit 120 returns the process to step S108 and maintains the second ink depletion mode until the elapsed period after the initial reception of the releasing command exceeds the predetermined period or the releasing command is received.

Alternatively, when the elapsed period after the initial reception of the releasing command exceeds the predetermined period in step S108 (No in step S108), the mode switching unit 120 permits proceeding to step S113 and switches all printing including the monochrome printing to the print disapproval state (the third ink depletion mode). In this way, it is possible to put a limitation on the period in which the monochrome printing can be executed in the state where the color ink has run out. Accordingly, it is possible to reduce the consumption of a printing head or the like.

When it is determined that the releasing command has been received from the printer driver unit 220 in step S109 (Yes in step S109), the mode switching unit 120 determines whether the black ink has run out (step S110). When it is determined that the releasing command is initially received in step S109, the mode switching unit 120 starts a measurement of the elapsed time from this pint in time by using a counter or the like in the multi-function apparatus 100.

When the black ink has run out (Yes in step S110), the mode switching unit 120 permits proceeding to step S113 and switches the multi-function apparatus 100 to the print disapproval state (the third ink depletion mode).

Alternatively, when the black ink has not run out after the reception of the releasing command (Yes in step S110), the mode switching unit 120 releases the ink depleted state and sets the mode to the monochrome printing mode (step S111). Here, the exclusive controller 130 receives only one printing job transmitted from the printer driver unit 220 and supplies the monochrome print data included in the received printing job to the print executing unit 140.

The print executing unit 140 prints the monochrome print data supplied from the exclusive controller 130 (step S112). When the printing of the monochrome print data corresponding to one printing job is completed, the mode switching unit 120 returns the process to step S107 and sets the mode of the multi-function apparatus 100 to the second ink depletion mode again. In this way, when the printing corresponding to one printing job is completed, the exclusive controller 130 does not receive any printing jobs as long as a new releasing command is not received.

In this case, when step S113 proceeds, the mode switching unit 120 sets the multi-function apparatus 100 to the third ink depletion mode (step S113). Here, the exclusive controller 130 stops receiving all of the printing jobs. The mode switching unit 120 notifies the printer driver unit 220 that the mode has been set to the third ink depletion mode. After the setting to the third ink depletion mode, the mode switching unit 120 does not switch the multi-function apparatus 100 to any other mode until the ink cartridge is exchanged.

The mode switching unit 120 terminates the mode switching process when the ink cartridge has been exchanged.

Figure 4:
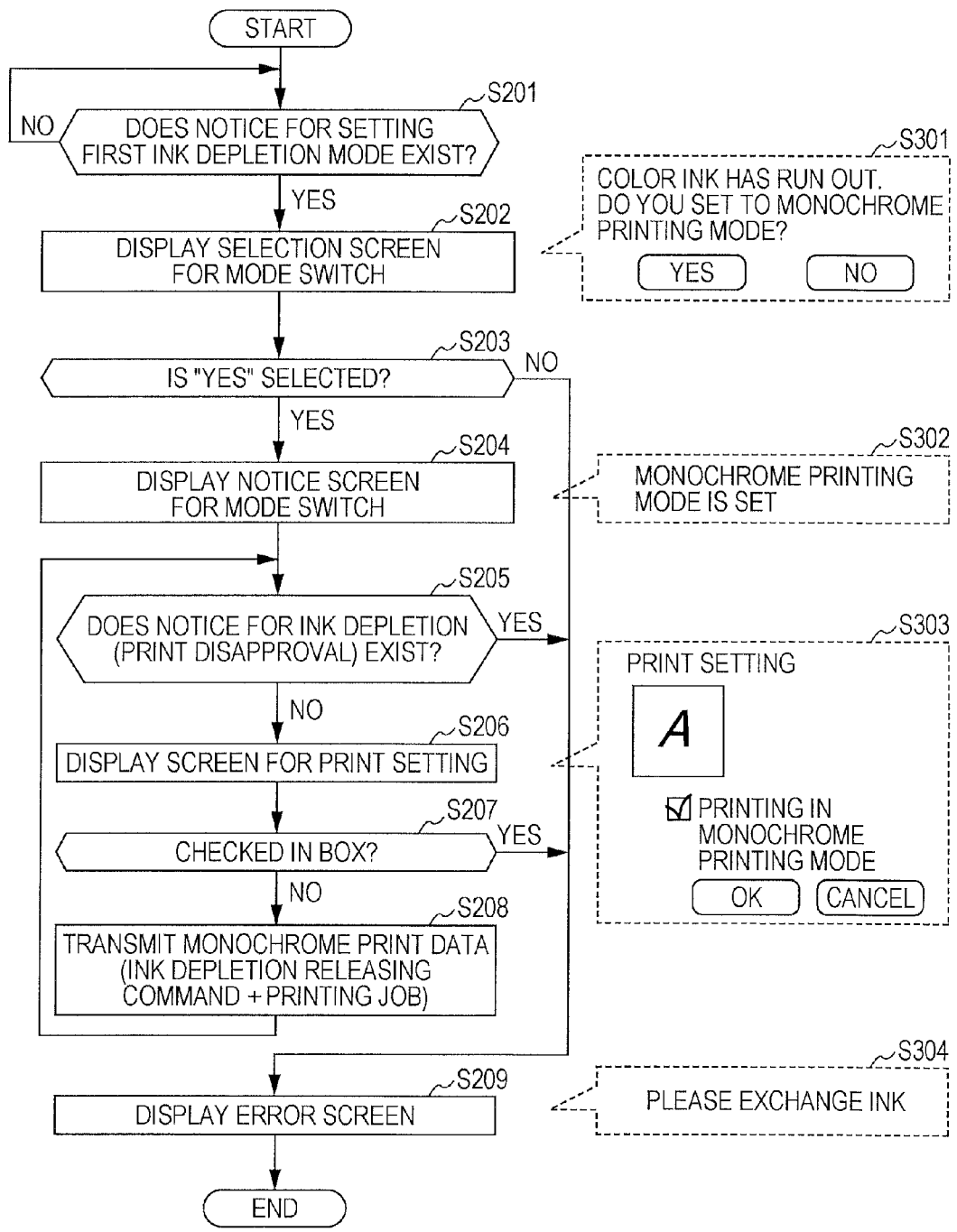
FIG. 4 is a flowchart illustrating a print setting process executed by an information processing apparatus.

The noticeable operations of the information processing apparatus 200 will be described. FIG. 4 is a flowchart illustrating a print setting process executed by the information processing apparatus 200.

The printer driver unit 220 of the information processing apparatus 200 stands by until receiving a notice for setting the first ink depletion mode from the multi-function apparatus 100 (No in step S201). When the printer driver unit receives this notice (Yes in step S201), the printing setting process starts. Here, the notice from the multi-function apparatus 100 corresponds to a notice generated by the mode switching unit 120 in step S104 described above.

The printer driver unit 220 allows the display device to display a selection screen 301 receiving an operation of selecting whether the multi-function apparatus 100 switches the first ink depletion mode to the second ink depletion mode (step S202). For example, the printer driver unit 220 displays the selection screen containing a "YES" button for allowing the multi-function apparatus 100 to permit proceeding to the second ink depletion mode and a "NO" button for not allowing the multi-function apparatus 100 to permit proceeding to the second ink depletion mode, as indicated by a dotted line in the drawing.

Here, the printer driver unit 220 receives an operation of the user touching the "YES" button or the "NO" button and determines whether the "YES" button is selected (step S203). When the operation of the user touching the "YES" button is received, the printer driver unit 220 determines that there has been an instruction for allowing the multi-function apparatus 100 to permit the mode to proceed to the second ink depletion mode (Yes in step S203) and transmits a request for proceeding to the second ink depletion mode to the multi-function apparatus 100.

The printer driver unit 220 allows the display device to display a notice screen 302 for notifying the user that the multi-function apparatus 100 has been set to the second ink depletion mode (step S204). For example, the printer driver unit 220 displays the notice screen containing a message for representing the setting of the second ink depletion mode, as indicated by a frame of a dotted line in the drawing.

Alternatively, when the operation of touching the "NO" button in step S203 is received, the printer driver unit 220 determines that there has been an instruction for not allowing the multi-function apparatus 100 to permit the mode to proceed to the second ink depletion mode (No in step S203) and permits the mode to proceed to step S209 without transmitting the request for allowing the multi-function apparatus 100 to permit the mode to proceed to the second ink depletion mode.

When the process proceeds to step S209, the printer driver unit 220 allows the display device to display an error screen 304 for prompting the user to exchange the ink which has run out in the multi-function apparatus 100 (step S209). For example, the printer driver unit 220 displays the error screen containing a message for prompting the user to exchange the ink, as indicated by a frame of a dotted line in the drawing.

After the error screen is displayed, the printer driver unit 220 terminates the print setting process.

In this case, after the notice screen is displayed in step S204, the printer driver unit 220 determines whether a notice for setting the third ink depletion mode (print disapproval) has been received from the multi-function apparatus 100 (step S205). When this notice is received (Yes in step S205), the printer driver unit 220 permits the mode to proceed to step S209 described above to display the error screen. In addition, the notice from the multi-function apparatus 100 corresponds to the notice executed by the mode switching unit 120 in step S113 described above.

Alternatively, the printer driver unit 220 permits the mode to proceed to step S206, when it is determined that the notice for setting the third ink depletion mode has not been received (No in step S205).

When the process proceeds to step S206, the printer driver unit 220 allows the display device to display a screen for setting the printing on the image data of the print target (step S206). For example, the printer driver unit 220 displays a print setting screen 303 which contains a box for selecting whether the printing is executed in the monochrome printing mode, as indicated by a frame of a dotted line in the drawing. Initial setting is checked in the box, as illustrated in the drawing.

When an operation of the user touching an "OK" button in the state where the initial setting is checked in the box (No in step S207), the printer driver unit 220 converts the image data of the print target into the monochrome print data. In addition, the releasing command for releasing the ink depleted state of the multi-function apparatus 100 and the printing job for the converted monochrome print data are transmitted to the multi-function apparatus 100 (step S208).

After the releasing command and the printing job are transmitted to the multi-function apparatus 100, the printer driver unit 220 can transmit the monochrome print data to the multi-function apparatus 100 several times by returning the process to step S205 until the notice for setting the third ink depletion mode is received (Yes in step S205).

Alternatively, when an operation of touching the "OK" button is executed in the state where the initial setting is not checked in the box in step S207 (Yes in step S207), the printer driver unit 220 permits the mode to proceed to step s209 so as to display the error screen. In this way, when the multi-function apparatus 100 is in the ink depleted state, the print data other than the monochrome print data cannot be transmitted from the printer driver unit 220 to the multi-function apparatus 100.

In the printing system 10 according to this embodiment, only the information processing apparatus 200 is capable of issuing (transmitting) the releasing command to the multi-function apparatus 100. Only when receiving the releasing command, the multi-function apparatus 100 temporarily releases the ink depleted state and executes the printing of the monochrome print data (or together with the releasing command) received after the ink depleted state is released. After the printing, the process returns to the ink depleted state to stop receiving the printing job. In this way, the multi-function apparatus 100 can print only the monochrome print data transmitted from the information processing apparatus 200, even when the color ink has run out.

Since the user is permitted to select whether the multi-function apparatus 100 permits the mode to proceed to the second ink depletion mode in step S202 described above, the monochrome printing which the user does not desire to be executed is not executed in the multi-function apparatus 100.

The invention is not limited to the above-described embodiment, but may be modified and applied in various forms.

In the above-described embodiment, the print setting process ends after the error screen is displayed in step S209. However, the invention is not limited thereto. For example, after the error screen is displayed in step S209, the process may proceed to step S206 so as to display the print setting screen on the basis of the instruction of the user.

In the mode switching process according to this embodiment, the mode switching unit 120 may omit the process of step S105. Then, the illegal pass shown in FIG. 2 may not be permitted.

What is claimed is:

1. A printing apparatus capable of executing color printing and monochrome printing, comprising:
   a mode controller configured to control a monochrome printing mode where the monochrome printing is executed, a first mode where reception of a printing job, which is print data, from a driver stops in response to running out of a color image forming medium, and a second mode where the reception of the printing job stops and procession to the monochrome printing mode is possible;
   an exclusive controller configured to control the reception of the print job and receive only one printing job in a first time period; and
   a print executing unit which execute printing on the basis of the printing job received by the exclusive controller,
   while stopping the reception of the printing job in the first mode, the mode controller deleting all accumulated printing jobs from the printing apparatus, which have been accumulated in the printing apparatus before stopping the reception of the printing job in the first mode,
   in the first mode, the exclusive controller maintaining stopping the reception of the printing job until receiving a releasing command for releasing the stopping of the reception of the printing job from the driver that is only a driver allowed to send the releasing command to the printing apparatus, and the exclusive controller receiving the printing job from the driver only when simultaneously receiving the releasing command from the driver, the exclusive controller receiving only one printing job each time receiving the releasing command, in the first mode, when the mode controller receives a request for proceeding to the second mode, the mode controller permitting a mode to proceed from the first mode to the second mode by notifying the driver only the monochrome printing is possible, and when the exclusive controller receives a monochrome printing command from the driver in the second mode, the mode controller permitting the mode to proceed to the monochrome printing mode, the print executing unit executing the printing on the basis of the printing job from the exclusive controller, and then the mode controller permitting the mode to return to the second mode.

2. The printing apparatus according to claim 1, wherein when the exclusive controller initially receives the monochrome printing command from the driver in the second mode and a predetermined period of time passes, the mode controller permits the mode to proceed to the third mode where procession to the monochrome printing mode is not possible.

3. The printing apparatus according to claim 1, wherein when the exclusive controller receives the releasing command from the driver, the mode controller permits the mode to proceed to the monochrome printing mode, the print executing unit executes the printing on the basis of the printing job from the exclusive controller, and then the mode controller permits the mode to return to the second mode.

4. A non-transitory recording medium having a computer program recorded thereon for causing a computer to function as a printing apparatus capable of executing color printing and monochrome printing and causing the computer to function as the printing apparatus which includes:

a mode controller configured to control a monochrome printing mode where the monochrome printing is executed, a first mode where reception of a printing job stops, which is print data, from a driver in response to running out of a color image forming medium, and a second mode where the reception of the printing job stops and procession to monochrome printing mode is possible;

an exclusive controller configured to control the reception of the print job from the driver and receive only one printing job in a first time period; and a print executing unit which executes printing on the basis of the printing job received by the exclusive controller, while stopping the reception of the printing job in the first mode, the mode controller deleting all accumulated printing jobs from the printing apparatus, which have been accumulated in the printing apparatus before stopping the reception of the printing job in the first mode, in the first mode, the exclusive controller maintaining stopping the reception of the printing job until receiving a releasing command for releasing the stopping of the reception of the printing job from the driver that is only a driver allowed to send the releasing command to the printing apparatus, and the exclusive controller receiving the printing job from the driver only when simultaneously receiving the releasing command from the driver, the exclusive controller receiving only one printing job each time receiving the releasing command, the program causing the mode controller to execute:

receiving a request for proceeding to the second mode in the first mode;

permitting a mode to proceed from the first mode to the second mode by notifying the driver that only the monochrome printing is possible upon receiving the request; and returning to the second mode after the mode controller permits the mode to proceed to the monochrome printing mode and the print executing unit executes the printing on the basis of a printing job from the exclusive controller, when the exclusive controller receives a monochrome printing command from the driver in the second mode.

5. A recording medium having a printer driver recorded thereon for causing a computer to execute:

receiving a notice for setting a first mode where reception of a printing job stops from a printing apparatus in response to running out of a color image forming medium;

notifying, during the first mode, a releasing command of the printing apparatus, as a driver that is only a driver allowed to send the releasing command to the printing apparatus, to proceed from the first mode to a monochrome printing mode where a monochrome printing is executed by the printing apparatus, the releasing commend being a command for releasing stopping of the reception of the printing job;

transmitting the printing job that is print data to the printing apparatus simultaneously when notifying the releasing command;

notifying the printing apparatus of a request for proceeding from the first mode to a second mode where the reception of the printing job stops and procession from the second mode to the monochrome printing mode is possible in accordance with an instruction of a user; and printing monochrome print data by transmitting a monochrome printing command to the printing apparatus, proceeding to the monochrome printing mode, and transmitting the monochrome print data.

6. The recording medium according to claim 5, further causing a computer to execute deleting all accumulated printing jobs from the printing apparatus, which have been accumulated in the printing apparatus before stopping the reception of the printing job in the first mode, while stopping the reception of the printing job in the first mode.

* * * * *